United States Patent
Miyagi

(10) Patent No.: US 7,055,072 B2
(45) Date of Patent: May 30, 2006

(54) MEMORY SYSTEM

(75) Inventor: Hiroshi Miyagi, Jouetsu (JP)

(73) Assignee: Niigata Seimitsu Co., Ltd., Niigata (JP)

( * ) Notice: Subject to any disclaimer, the term of this patent is extended or adjusted under 35 U.S.C. 154(b) by 345 days.

(21) Appl. No.: 10/181,278

(22) PCT Filed: Nov. 16, 2001

(86) PCT No.: PCT/JP01/10040

§ 371 (c)(1),
(2), (4) Date: Nov. 13, 2002

(87) PCT Pub. No.: WO02/41152

PCT Pub. Date: May 23, 2002

(65) Prior Publication Data

US 2004/0225928 A1    Nov. 11, 2004

(30) Foreign Application Priority Data

Nov. 16, 2000    (JP) ............................. 2000-349957

(51) Int. Cl.
*G06F 11/00* (2006.01)
(52) U.S. Cl. .................... 714/54; 714/6; 714/49
(58) Field of Classification Search ................. 714/54, 714/6, 797, 48, 719, 49
See application file for complete search history.

(56) References Cited

U.S. PATENT DOCUMENTS

| | | | | |
|---|---|---|---|---|
| 5,128,944 A | * | 7/1992 | Flaherty et al. ................ | 714/6 |
| 5,495,447 A | * | 2/1996 | Butler et al. ................ | 365/200 |
| 5,907,671 A | * | 5/1999 | Chen et al. ................ | 714/6 |
| 6,154,872 A | * | 11/2000 | Jones ................ | 714/797 |
| 6,349,390 B1 | * | 2/2002 | Dell et al. ................ | 714/6 |

FOREIGN PATENT DOCUMENTS

| | | |
|---|---|---|
| JP | 62-192837 | 8/1987 |
| JP | 63-143649 | 6/1988 |
| JP | 63-279347 | 11/1988 |
| JP | 3-113644 | 5/1991 |

(Continued)

OTHER PUBLICATIONS

Parag K. Lala, translated by Yoshihiro Touma, "Fault-Tolerance Nyuumon", Ohm sha, Sep. 15, 1988, pp. 81-87, 100-102.

*Primary Examiner*—Robert Beausoliel
*Assistant Examiner*—Yolanda L Wilson
(74) *Attorney, Agent, or Firm*—Dellett & Walters

(57) ABSTRACT

It is object to provide a memory system for reliably detecting an error, if any, in management information that is read out. The same content of telephone number data is stored in memories 8, 9, 10. When telephone number data is read out of the memories 8, 9, 10, a comparing section 20 judges if all the contents of the telephone number data are the same. If not, a parity error detecting section 22 performs parity check of the telephone number data and excludes the content from which a parity error is detected as an object not to be processed thereafter. After the parity check, an object-to-be-processed determining section 24 determines whether or not there is any telephone number data in the majority on the basis of the criterion that the sum of the pieces of the telephone number data that is read out. If there is not such telephone number data, it judges that there is an error.

5 Claims, 5 Drawing Sheets

FOREIGN PATENT DOCUMENTS

| | | |
|---|---|---|
| JP | 3-58743 | 6/1991 |
| JP | 3-161187 | 6/1996 |
| JP | 10-222430 | 8/1998 |
| JP | 11-164486 | 6/1999 |

* cited by examiner

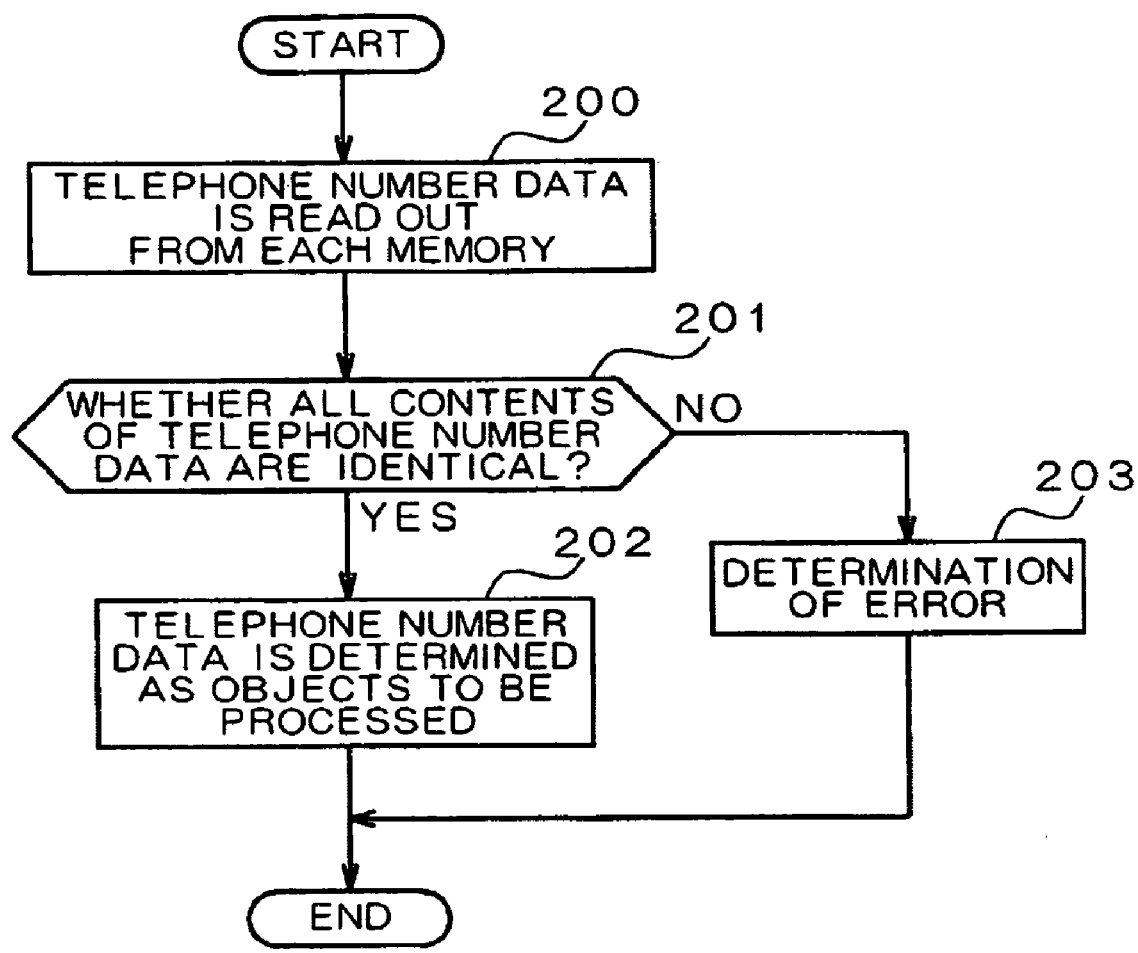

MEMORY SYSTEM

TECHNICAL FIELD

The present invention relates to a memory system for reading management information stored in memory contained in various electronic devices.

BACKGROUND ART

Some electronic devices have non-volatile memory such as EEPROM in which important data is stored. For example, in a mobile phone, its non-volatile memory stores information unique to that mobile phone, such as its telephone number and serial number (manufacturer's number), and management information such as a password for identifying the owner of that mobile phone to restrict the use of the mobile phone to its user.

Recently, mobile phones providing various services such as Internet connection services have become popular. In such a mobile phone, a user registration number, which is management information required for using such services, is stored in non-volatile memory. Service providers can use the user registration number to identify the user and manage information about usage-based service charges.

In a personal computer (hereinafter called "PC"), management information such as a user ID for identifying its owner and a serial number unique to the PC is stored in its non-volatile memory. These user ID and serial number are used for security control to prevent unauthorized use of the PC by another person.

Some non-volatile memories contained in electronic devices may exhibit unstable memory retention due to a defect and data such as management information stored may not properly retained. Such failures may occur particularly when using EEPROM. EEPROM has the correct content kept therein just after management information has been written. However, a read error can occur, for example, when the user attempts to read out management information several days after it is stored by a write operation because it has not been held properly.

The various items of information described above are typically important information and if it contains any errors, various kinds of problem may arise. For example, if an error occurs in the telephone number of a mobile phone, telephone calls made through the phone can be charged to another user. If an error occurs in the user ID of a PC, the ID may be considered not matching the registered one even though the owner of the PC correctly inputs the ID that he or she has registered.

It is required that management information read from electronic devices be reliable. However, prior-art memory systems cannot reliably detect an error in read management information and the read management information therefore is not always reliable.

DISCLOSURE OF THE INVENTION

The present invention has been made in view of these problems and an object of the present invention is to provide a memory system that can reliably detect an error in management information that is read out. Another object of the present invention is to provide a memory system that can improve the reliability of management information that is read out.

In a memory system according to the present invention, the same content of management information is stored in three or more areas in memory. When these contents of management information stored in the memory areas are read by management information reading unit, the read management information contents are compared with each other by management information comparing unit. If it is determined through the comparison that there is a mismatch, first error detecting unit detects the occurrence of the error.

Because it is determined that an error has occurred if there is a mismatch among the contents of information read from the three or more areas that store the same management information, the error in the read management information can be detected without fail, thereby improving the reliability of the management information.

In another memory system according to the present invention, the same management information is stored in three or more areas in memory. When the management information stored in the plurality of memory areas is read by management information reading unit, the contents of the management information read are compared with each other by management information comparing unit. If it is determined through the comparison that there are mismatches, object-to-be-processed determining unit counts that information contents that constitute the majority of the information read by the management information reading unit as management information to be processed.

In the case where the identical management information is stored in three or more areas, it is very unlikely that errors occur in the majority of the management information read out and the errors are identical. Therefore, contents that constitute the majority of the information are determined as management information to be processed, thereby ensuring higher reliability of the management information.

Preferably, a plurality of memory devices are formed in a plurality of isolated locations during a manufacturing process of semiconductor chips containing the above-described memory and other active devices, and management information is stored in each of the plurality of memory devices. It is unlikely that the same failure occurs in a plurality of memory devices isolatedly formed in a plurality of locations on the semiconductor chip. Therefore, in the event that failures occur in some of the memory devices, correct management information can be reliably read from the remaining memory devices.

Alternatively, the above-described memory may be formed by a plurality of physically different memory chips and management information may be stored in these memory chips. Because physically different memory chips are typically manufactured in different batches, it is very unlikely that exactly the same error occurs in identical contents of management information read from a plurality of memory chips and the identical contents of management information containing the error constitute the majority of the management information and are determined as the objects to be processed. Thus, higher reliability of management information can be ensured.

Preferably, a predetermined error detecting code is added to the above-described management information and stored with the information in the plurality of memory areas. When the management information reading unit reads the management information from the plurality of areas, preferably a second error detecting unit performs an error detection process based on the error code.

An error detecting code, such as a parity bit or CRC (Cyclic Redundancy Check), can be added to management information and, when the management information is read, the error detecting code can be used to perform error detection, thereby improving the accuracy of the error detection for the read management information and further improving the reliability of the management information.

Preferably, a third error detecting unit is provided and if comparison by the management information comparing unit shows that there is mismatches and a plurality of contents of management information read by the management information reading unit do not include identical information contents that constitute the majority of the management information, the third error detecting unit detects the occurrence of errors.

If the pluralities of contents of management information do not include identical information contents that constitute the majority, the contents of management information may contain errors. Error detection performed in this way can detect the errors without fail.

The above-described management information is preferably a serial number that is unique to an electronic device containing memory, or identification information that is unique to the user of an electronic device containing memory. In particular, the identification information unique to the user of an electronic device may be the telephone number of a mobile phone or PHS (Personal Handyphone System) or a user ID for a PC. Thus, an error in important management information such as unique user information and a serial number unique to each electronic device can be minimized and, in the event of an error, it can be detected without fail.

It is desirable that the number of areas in which the management information is stored be an odd number. If the number of memory areas were an even number, the identical management information could be evenly divided into halves and it would be difficult to determine which of the halves should be used. An odd number of memory areas can avoid such a problem and facilitate ready determination of management information to be processed.

BRIEF DESCRIPTION OF THE DRAWINGS

FIG. 6 shows a flowchart of a process performed in the variation of the mobile phone for reading the telephone number data of the mobile phone.

DETAILED DESCRIPTION OF THE PREFERRED EMBODIMENTS

Embodiments of a mobile phone to which a memory system according to the present invention is applied will be described below with reference to the accompanying drawings.

Figure 1:
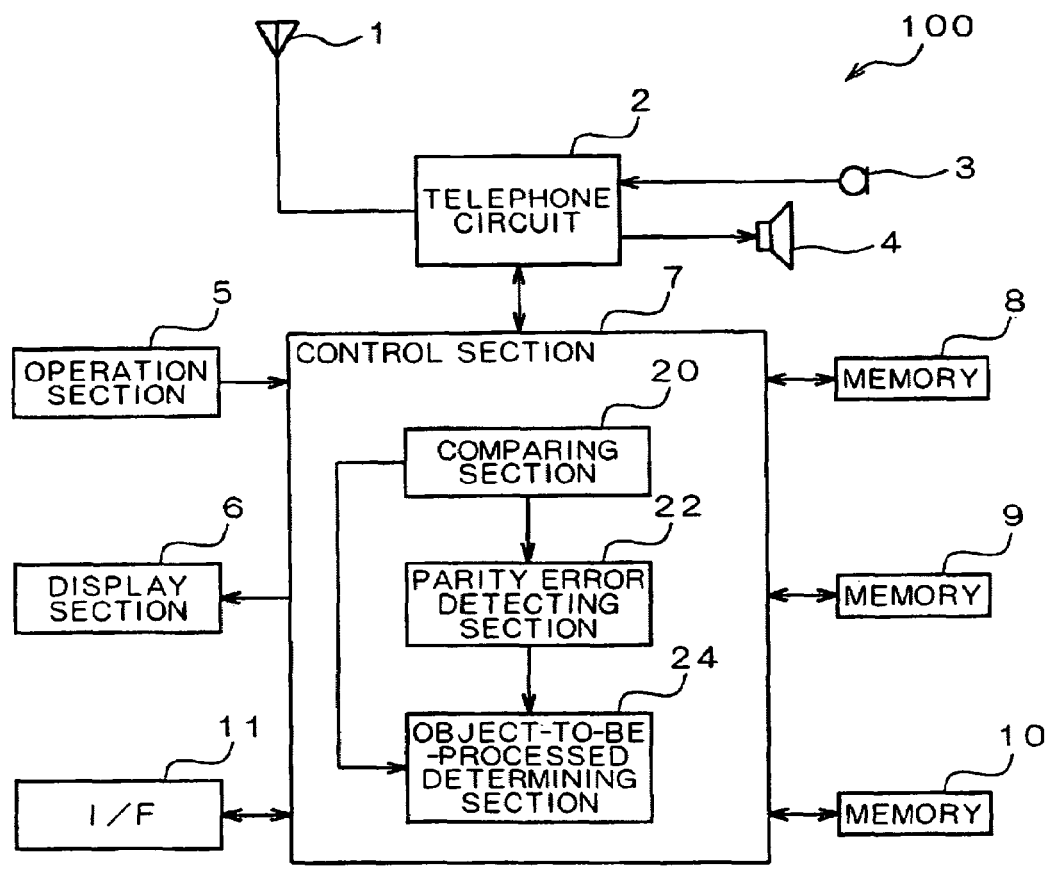
FIG. 1 shows a detailed configuration of a mobile phone according to one embodiment of the present invention.

FIG. 1 shows a detailed configuration of a mobile phone of one embodiment. The mobile phone 100 shown in FIG. 1 includes an antenna 1, telephone circuit 2, microphone 3, speaker 4, operation section 5, display section 6, control section 7, three memories 8, 9, and 10, and an interface (IF) 11.

The telephone circuit performs processes for sending and receiving telephone calls, the telephone circuit 2 receives a radio wave sent from a base station (not shown) in the neighborhood through the antenna 1, and demodulates it to generate sound signals and control signals. It also performs a predetermined modulation process on sound signals and control signals provided from the microphone 3 to generate signals to be sent to the base station and provides it to the antenna 1.

The microphone 3 collects voice made by a user during a telephone conversation, converts it into an electric signal (sound signal), and provides it to the telephone circuit 2. The speaker 4 outputs voice of the other party of the telephone conversation based on a sound signal provided from the telephone circuit 2.

The operation section 5 includes operation keys, such as a power key, numeric keys, and function keys, that are required for providing instructions to the mobile phone 100 and outputs to the control section 7 a signal according to an operation performed by the user. The display section 6 displays information such as the current date and the telephone number of a caller based on image data provided from the control section 7.

Control section 7 controls the operation of the entire mobile phone 100. In particular, the control section 7 controls the operation of the telephone circuit 2 when telephone calls are sent or received, sends and receives data to and from an external device (not shown) connected to it through the interface 11, writes and reads data into and from the memories 8, 9, and 10, generates image data to be displayed on the display section 6, and performs other processes.

The memories 8, 9, and 10 are implemented by non-volatile memory such as EEPROM and store various data written by the control section 7.

According to the present embodiment, data representing a "telephone number" (telephone number data), which is identification information unique to the owner (user) of the mobile phone 100, is stored in each of the memories 8, 9, and 10 as management information. The telephone number data is written through a special, write device at a distributor at the time of purchase of the mobile phone 100, for example. The telephone number data stored in the memories 8, 9, and 10 cannot be overwritten through facilities, such as the operation section 5, that are provided in the mobile phone 100.

According to the present embodiment, a parity bit is added to the telephone number data stored in the memories 8, 9, and 10, as an error detecting code. When the telephone number data is read, the parity bit can be used to perform a parity check for error detection. The parity bit may be added using even parity or odd parity scheme.

The interface 11 is an external connection terminal for connecting the mobile phone 100 with an external device. It performs processes for outputting data received from the external device to the control section 7 and sending data provided from the control section 7 to the external device. For example, when telephone number data is written into the memories 8, 9, and 10, the interface 11 is used to connect the above-mentioned write device to the mobile phone 100.

Figure 2:
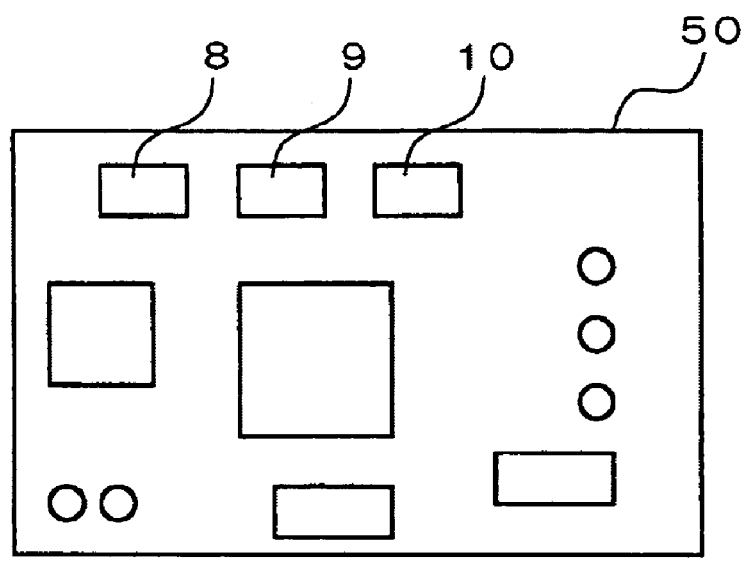
FIG. 2 illustrates an installation mode of memories.
Figure 3:
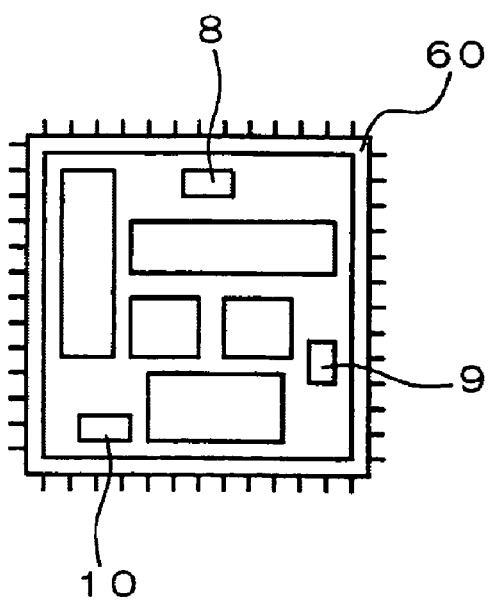
FIG. 3 illustrates another installation mode of memories.

An installation mode of memories 8, 9, and 10 will be specifically described below. FIGS. 2 and 3 illustrate installation modes of the memories 8, 9, and 10. FIG. 2 shows an example in which the memories 8, 9, and 10 are implemented by physically separate memory chips. As shown in FIG. 2, the three memories 8, 9, and 10 implemented by the memory chips are installed on a print circuit board 50 containing components such as LSI chips for implementing functions of the above-described components such as the control section 7. In this installation mode in which the memories 8, 9, and 10 are implemented by a plurality of physically different memory chips, the probability that exactly the same error occurs in management information read from the memories 8, 9, and 10 is very low. Therefore, it can provide improved reliability of the read management information.

FIG. 3 shows an example in which memories 8, 9, and 10 are implemented by memory devices provided in a plurality of locations distant from each other on a semiconductor chip. It shows an internal configuration of a semiconductor chip package typically. In the semiconductor chip 60 including active devices required for implementing the functions of control section 7 and other components as shown in FIG. 3, the memory devices are disposed in locations distant from each other to implement the memories 8, 9, and 10. This arrangement can decrease the probability that the same failure occurs in the memory devices. In the event that failures occur in some of these memory devices, correct management information can be read from any of the remaining memory devices with reliability.

A detailed configuration of the above-described control section 7 will be described below. The control section 7 shown in FIG. 1 comprises a comparing section 20, parity error detecting section 22, and object-to-be-processed determining section 24.

The comparing section 20 compares contents of telephone number data read from the memories 8, 9, and 10 to determine whether all of the contents of telephone number data match with each other.

The parity error detecting section 22 performs a predetermined parity check on the telephone number data after the comparison is made by the comparing section 20 for detecting a parity error.

The object-to-be-processed determining section 24 determines whether there are identical contents of telephone number data that constitute the majority of the total number of the read contents of telephone number data, and if so, determines the identical contents of telephone number data as the objects to be processed.

The control section 7 corresponds to the management information reading unit, the comparing section 20 corresponds to the management information comparing unit, the object-to-be-processed determining section 24 corresponds to the object-to-be-processed determining unit and the third error detecting unit, and the parity error detecting section 22 corresponds to the second error detecting unit.

A process for reading telephone number data in the mobile phone 100 configured as described above will be described below.

Figure 4:
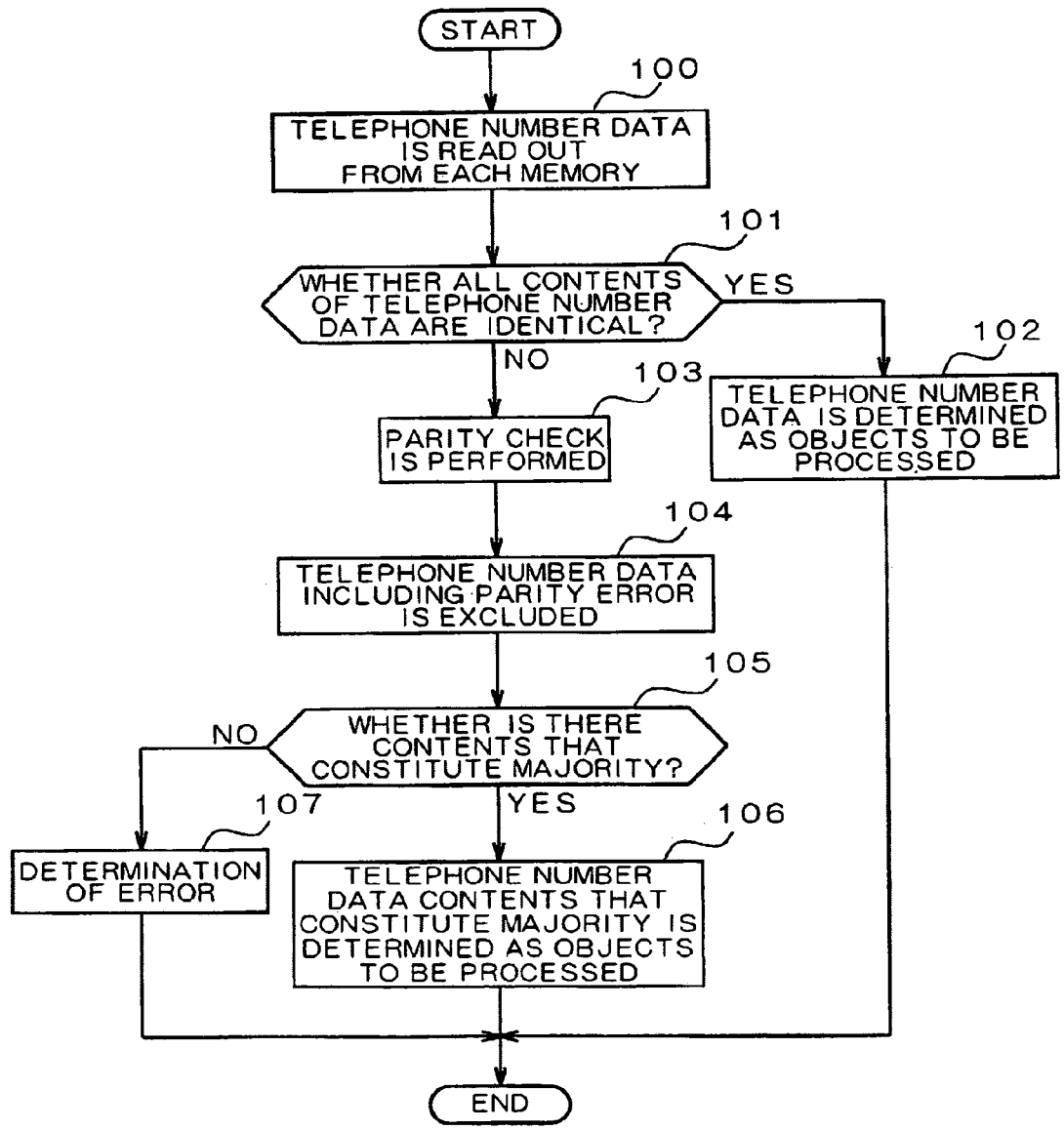
FIG. 4 shows a flowchart of a process performed in a mobile phone for reading the telephone number data of the mobile phone.

FIG. 4 shows a flowchart of a process performed in the mobile phone 100 for reading telephone number data.

When telephone number data is needed to be read (for example, when the user wants to make a call), the control section 7 reads telephone number data stored in each of the memories 8, 9, and 10 (step 100).

When the telephone number data is read out, the comparing section 20 in the control section 7 compares the contents of telephone number data with each other to determine whether all of the contents of telephone number data are identical (step 101).

If all the contents of telephone number data are identical, positive determination is made at step 101. The comparing section 20 reports the positive determination to the object-to-be-processed determining section 24. The object-to-be-processed determining section 24 receives the report and determines the read contents of the telephone number data as the objects to be processed (step 102).

On the other hand, if not all the contents of the telephone number data are identical, negative determination is made at step 101. The comparing section 20 reports the negative determination to the parity error detecting section 22. The parity error detecting section 22 receives the report and performs a parity check on the read telephone number data (step 103). It excludes data in which a parity error is detected from the telephone number data that is subject to subsequent processes (step 104).

Then the object-to-be-processed determining section 24 determines whether there is contents of telephone number data that constitute the majority of the total number of the telephone number data contents read at step 100 (step 105). In particular, because the total number of telephone number data contents read at step 100 are three in this embodiment, it determines at step 105 whether there are two or more identical telephone number data contents.

If there are identical telephone number data contents that constitute the majority, positive determination is made at step 105 and the object-to-be-processed determining section 24 determines the telephone number data contents as objects to be processed (step 106).

On the other hand, if no telephone number data contents constitute the majority, negative determination is made at step 105 and the object-to-be-processed determining section 24 determines that an error is detected in the telephone number data (step 107). If this is the case, the control section 7 performs predetermined error handling such as displaying on the display section 6 a message indicating the telephone-number-data-read-error.

As described above, three identical contents of telephone number data are stored in the three memories 8, 9, and 10 in the mobile phone 100 according to the present embodiment and, when the telephone number data is read, contents of telephone number data that constitute the majority of the telephone number data are determined as objects to be processed. It is very unlikely that errors occur in the majority of telephone number data read from the same telephone number data stored in the plurality of memory locations and, in addition, the errors in the telephone number data are identical. Therefore, data that constitutes the majority can be determined as the object to be processed, increasing the reliability of the read management information. If no telephone number data contents constitute the majority, this indicates the occurrence of errors in the telephone number data, therefore the errors can be detected without fail.

The present invention is not limited to the above-described embodiments. Various variations of the present invention are possible without departing from the spirit and scope of the present invention. For example, in the embodiments described above, if all the telephone number data read from the memories 8, 9, and 10 are not identical but the majority of telephone number data is identical, the majority is used as the object to be processed. In an alternative embodiment, read data may be used as the object to be processed only if all the read telephone number data are identical.

Figure 5:
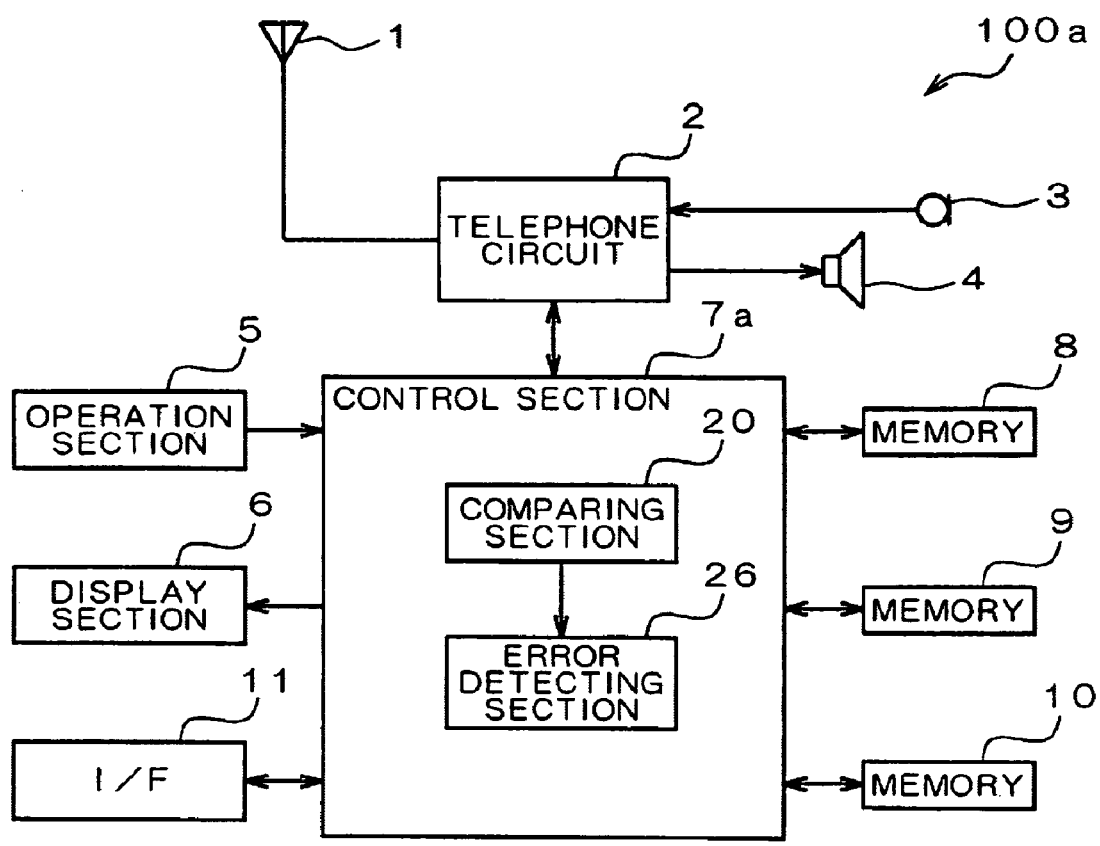
FIG. 5 shows a configuration of a variation of a mobile phone that uses read telephone number data as an object to be processed only if all the contents of the data are identical.

FIG. 5 shows a configuration of a variation of a mobile phone in which read telephone number data is used as the object to be processed only if all the read telephone number data are identical. The mobile phone 100*a* shown in FIG. 5 includes an antenna 1, a telephone circuit 2, a microphone 3, a speaker 4, an operation section 5, a display section 6, a control section 7*a*, three memories 8, 9, and 10, and an interface (IF) 11. The same components of the mobile phone 100a in FIG. 5 as those of the mobile phone 100 described above and shown in FIG. 1 are labeled with the same reference numbers. Detailed description of the same components will be omitted. The following description will concentrate on differences between the mobile phones 100 and 100a.

The control section 7a shown in FIG. 5 includes a comparing section 20 and error detecting section 26. Compared with the control section 7 shown in FIG. 1, the parity error detecting module 22 and object-to-be-processed determining section 24 are omitted from the control section 7a and an error detecting section 26 is added.

The comparing section 20 compares telephone number data contents read from memories 8, 9, and 10 to determine whether all the telephone number data contents are identical, as described above.

If the comparison by the comparing section 20 determines that all the telephone number data contents are not identical (mismatch determination), the error detecting section 26 detects the occurrence of an error. If the comparison by the comparing section 20 determines that all the telephone number data contents are identical, the error detecting section 26 determines the telephone number data contents as the objects to be processed. The error detecting section 26 corresponds to the first error detecting unit.

No parity bits are added to telephone number data stored in the memories 8, 9, and 10 in the mobile phone 100a of this variation.

A process for reading telephone number data in the mobile phone 100a configured as described above will be described below.

FIG. 6 shows a flowchart of the process for reading telephone number data in the mobile phone 100a of this variation shown in FIG. 5.

If telephone number data is needed to be read (for example, when the user wants to make a call), the control section 7a reads telephone number data stored in each of the memories 8, 9, and 10 (step 200).

When the telephone number data is read out, the comparing section 20 in the control section 7a compares the contents of telephone number data with each other to determine whether all of the contents of telephone number data are identical (step 201).

If all the contents of telephone number data are identical, positive determination is made at step 201 and the error detecting section 26 determines the read telephone number data contents as the objects to be processed (step 202).

On the other hand, if not all the contents of the telephone number data are identical, negative determination is made at step 201 and the error detecting section 26 determines that it detects the occurrence of an error (step 203). Then, predetermined error handling is performed by the control section 7a, such as displaying a message indicating the occurrence of the error on a display section 6.

In this way, the mobile phone 100a of this variation uses contents of the read telephone number data as the objects to be processed only if all the contents of the read telephone number data are identical. This variation also can ensure that errors in the read telephone number data are detected and provide improved reliability of the telephone number data. Furthermore, this variation requires only the determination of whether all the telephone number data contents are identical, thus advantageously simplifying the process for detecting the occurrence of an error.

While the embodiments have been described with respect to the telephone number of a mobile phone as an example of management information unique to a user, the management information is not limited to this. The management information may be any of various types information such as a password or e-mail address used in a mobile phone that allows for sending and receiving e-mail. Furthermore, the management information is not limited to information unique to users. The management information may be a serial number unique to each mobile phone.

While the embodiments have been described in which the memory system of the present invention is applied to mobile phones, the present invention is not limited to the mobile phones. The present invention can be applied to various types of electronic devices. For example, the memory system of the present invention can be applied to a personal computer, and its user ID or password can be stored in it as management information. The management information may be a serial number that is unique to the PC. The memory system of the present invention can also be applied to a PHS in a manner similar to those in the embodiments described above.

Furthermore, while the management information (telephone number data) is stored in three locations, memories 8, 9, 10 in the embodiments described above, the number of areas in which the management information is stored is not limited to three. It may be a number, preferably an odd number, greater than three. The accuracy of error detection can be improved by increasing the number of areas storing management information. Also, the management information may be stored three or more locations in one memory.

While in the embodiment described above a parity bit is used as an error detecting code to be added to telephone number data, any of other error detecting codes, such as a CRC code, may be used.

While in the embodiments described above a parity bit is added to telephone number data beforehand and a parity check is performed when the telephone number data is read, the parity check can be omitted to simplify the configurations and processes of the embodiments. In that case, the parity error detecting section 22 in the control section 7 shown in FIG. 1 can be omitted from the configurations. Also, steps 103 and 104 can be omitted from the process shown in FIG. 4. If the determination at step 101 is negative, the process may directly proceed to step 105 to simplify the process.

INDUSTRIAL APPLICABILITY

According to the present invention, as described above, identical management information is stored in three or more areas and, if the contents of the management information read from the areas are not identical, it is determined that an error has occurred. Thus, an error in the read management information can be detected without fail and the reliability of the management information can be improved.

Because it is very unlikely that accidental errors occur in the majority of identical management information read from three or more areas and the contents of the erroneous data are identical, management information contents that constitute the majority of the management information can be determined as objects to be processed, thereby improving the reliability of the management information.

The invention claimed is:

1. A memory system comprising:
   memory having three or more areas in which identical management information is stored;
   management information reading unit for reading said management information stored in each of said areas;

management information comparing unit for comparing a plurality of pieces of said management information read by said management information reading unit; and object-to-be-processed determining unit for determining contents that constitute the majority of said plurality of pieces of management information read by said management information reading unit as management information to be processed if the comparison by said management information comparing unit determines that there is a mismatch, wherein an error detecting code is added to said management information and stored with said management information in said plurality of storage areas; and the memory system comprises a second error detecting unit for performing error detection based on said error detecting code when said management information reading unit reads said plurality of pieces of management information.

2. The memory system according to claim 1, comprising a third error detecting unit for detecting any error that occurs if the comparison by said management information comparing unit determines that there is a mismatch and no contents of said plurality of pieces of management information read by said management information reading unit constitute the majority of said read plurality of pieces of management information.

3. The memory system according to claim 1, wherein said management information is a serial number that is unique to an electronic device containing said memory.

4. The memory system according to claim 1, wherein said management information is identification information that is unique to a user of an electronic device containing said memory.

5. The memory system according to claim 1, wherein the number of the areas for storing said management information is an odd number.

* * * * *